June 30, 1970   E. M. REESER ET AL   3,517,711
LOGGING FORK WITH SAW ATTACHMENT
Filed Aug. 21, 1968
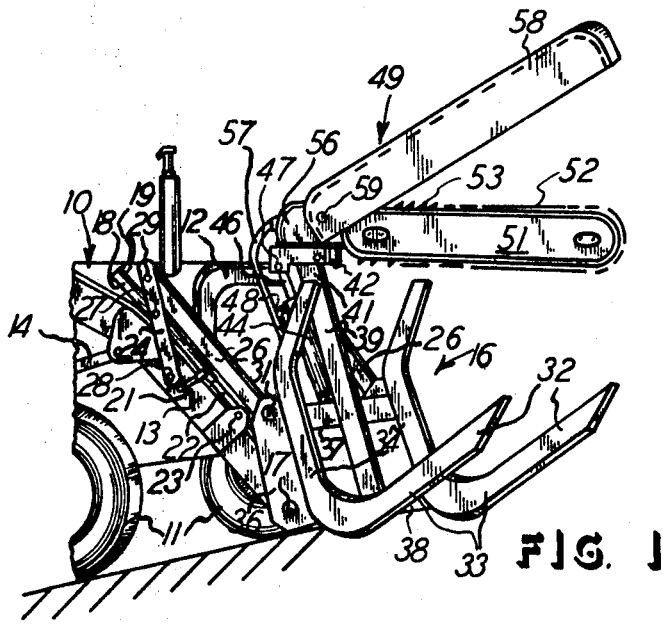
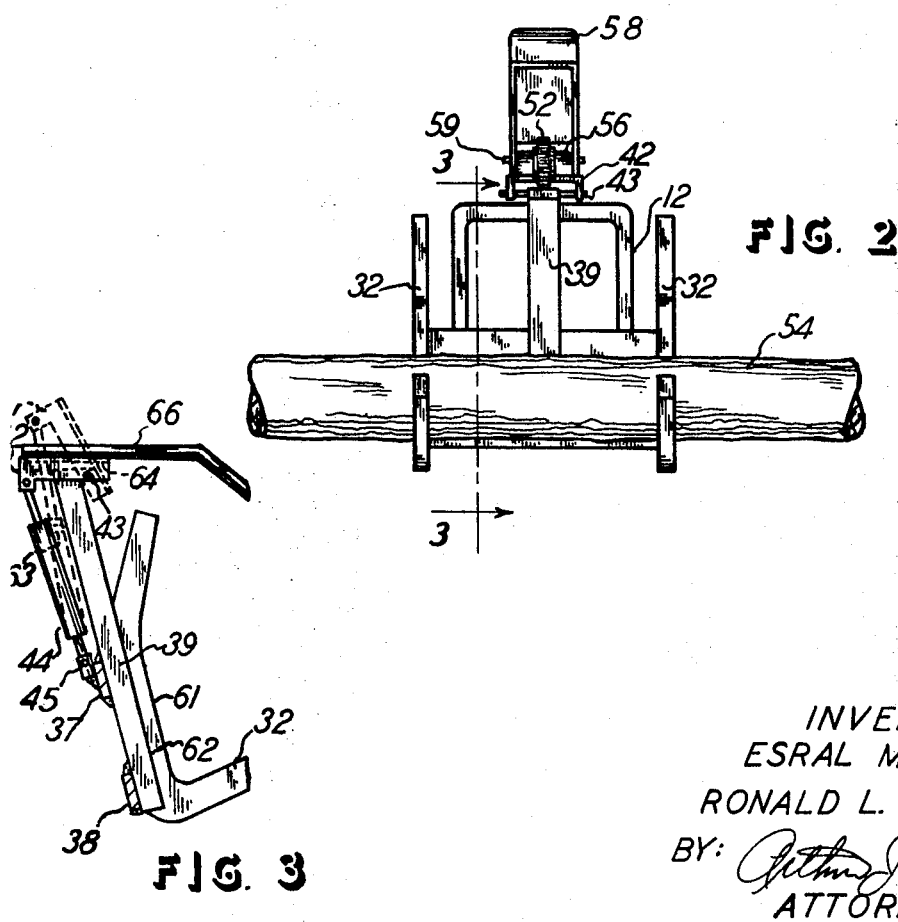
INVENTORS:
ESRAL M. REESER
RONALD L. ANDERSON
BY: *Arthur J. Hanemann*
ATTORNEY

United States Patent Office 3,517,711
Patented June 30, 1970

3,517,711
LOGGING FORK WITH SAW ATTACHMENT
Esral M. Reeser and Ronald L. Anderson, Burlington, Iowa, assignors to J. I. Case Company, Racine, Wis., a corporation of Wisconsin
Filed Aug. 21, 1968, Ser. No. 754,295
Int. Cl. B27b 17/00
U.S. Cl. 143—32       5 Claims

ABSTRACT OF THE DISCLOSURE

A logging fork with saw attachment mountable on a tractor having fork tines pivotally mounted on the front of the tractor. A chain saw is pivotally mounted adjacent the upper end of the fork for pivoting downwardly through powered pivot means. A log held by the fork tines is then cut by the saw which is operated by a motor. Cutting the log from above avoids pinching the saw by the log being cut.

Background of the invention

This invention relates to a logging fork with a chain saw attachment. The prior art is aware of tractors having logging forks or pallets pivotally mounted on the front ends of tractors for picking up logs which are lying on the ground. Further, it is well known in the art to have chain saws pivotally mounted on the forks, or their supporting structure, such that the saws can be pivoted to the logs and the saws can then be operated for cutting the logs. An example of this type of construction is shown in U.S. Pat. No. 3,254,686, in that patent, it will be seen that a chain saw may be provided either between the tines of the fork or outside the fork tines.

However, the location of the saw, the relationship of the structure between the fork and saw, and particularly the location of the pivotal mounting of the saw in the aforesaid patent, present problems relative to having the fork pick up logs, as well as presenting problems relative to the sawing of the logs held by the fork. For one thing, the saw operates to cut the logs in a manner which would cause them to pinch on the saw when the saw is mounted below the logs as shown in the aforesaid patent. Also, the saw is extending in a position which makes the saw vulnerable to damage when the fork is being used for picking up logs. Still further, a heavy and unnecessarily large fork structure is required for mounting the saw in a position which is reasonably safe for avoiding damage to the saw, and in a position which permits the saw to operate even though it is required to move through an angle which is at least ninety degrees, in order to cut the logs held by the fork.

The present invention recognizes the aforementioned problems, and it provides a solution to these problems by having the saw mounted at a location adjacent the upper end of the fork so that the saw can move downwardly on the logs and thereby avoid being pinched by the logs being cut. Further, the present invention locates the saw in a position which removes the saw from the danger of being damaged when the work is picking up the logs. Still further, the present invention provides a mounting for a saw attachment, with the mounting being such that it can be interchanged with or mounted at the point of the mounting of a commonly provided grapple pivotally mounted for securing the logs on the fork tines. In this manner, a chain saw can be pivotally mounted on the fork and it can be readily and easily attached to the grapple mounting member, and the power means for operating the grapple can also be utilized for pivoting the saw during sawing operation. In conjunction with the aforesaid features and advantages, the saw is mounted such that it can be readily moved away from the fork to be out of the way when logs are being picked up by the fork, and then the saw can also be readily moved into sawing position and through only a small angle for sawing through the logs supported on the fork tines.

Brief description of the drawing

FIG. 1 is a front perspective view of a logging fork with a chain saw attachment, all mounted on the front of a tractor which is fragmentarily shown.

FIG. 2 is a front elevational view of a portion of FIG. 1.

FIG. 3 is a sectional view taken on the line 3—3 of FIG. 2 but showing a grapple in place of the saw in FIG. 1.

Detailed description of the preferred embodiment

FIG. 1 shows a fragment of a front end, generally designated 10, of a tractor. The front end 10 includes tractor front wheels 11 and a front piece 12. The usual lift arms 13 are pivotally mounted on the tractor to be raised and lowered thereon by a pivot mounting not shown but which is commonly provided. Power means, shown by a hydraulic ram 14, are also commonly provided and extend between the tractor and the lift arms 13 for raising and lowering the arms 13.

The logging fork is generally designated 16 and is pivotally mounted on the lift arms 13 by means of the pivot pins 17, of which one is shown. Thus the fork 16 can be raised and lowered along with the raising and lowering of the arms 13, and the fork 16 can also be pivoted on the arms 13 about the axis of the pin 17 extending transversely to the fore-and-aft axis of the tractor. Power means are provided for pivoting the fork 16 on the arms 13, and such means is also common and is shown to include a hydraulic cylinder 18 having a pair of hoses 19 and 21 connected to the cylinder 18 for control of hydraulic fluid in the cylinder. The cylinder ram 22 extends from the cylinder 18 and is shown anchored on a pivot 23 which is in a fixed position on the arm 13. Links 24 and 26 pivotally connect the cylinder 18 to the fork 16. Thus the link 24 is pivotally connected by a pivot pin 27 to the cylinder 18, and opposite ends of the link 24 also have pivot pins 28 and 29 which pivotally connect the link 24 to the lift arm 13 and to the link 26, respectively. Finally, the link 26 is pivoted to the fork by a pivot pin 31. Thus extension and contraction of the hydraulic assembly of the cylinder 18 and ram 22 will cause desired pivotal action of the links 24 and 26 for consequent pivotal motion of the fork 16 about the pivot pins 17. Also, another assembly of the power lift means described could be provided, and normally would be provided, on the opposite side of the fork 16. The power lift assembly is conventional in a fork and in loader bucket mountings on tractors.

The fork 16 includes the two spaced-apart tines 32 which extend through lower or substantially horizontal portions 33 and through upright portions 34. Also, the fork 16 includes a support plate 36 on each left and right rear side of the fork 16, and cross-support brace members 37 and 38 also extend at the rear of the fork 16, and they extend between the tines 32 and are suitably secured thereto as by welding or the like. Finally, the fork includes an upstanding post 39 which is secured to the cross pieces 37 and 38 as by welding or the like, and the post 39 terminates in an upper end 41 which is shown to be slightly above the level of the upper ends of the fork tines 32. FIG. 2 clearly shows the post 39 is centrally located with respect to the tines 32.

The upper end 41 of the post 39 has a mounting member 42 pivotally secured thereto by means of a pin 43. Thus the member 42 can pivot in the fore-and-aft plane of the tractor. A power means, such as the hydraulic cylinder 44 is used for controlling and inducing the pivot of the mounting member 42. Thus the cylinder 44 is pivotally mounted on a pin 45 supported on the fork cross member 37, and the cylinder 44 has a ram 46 extending therefrom and pivotally connected by means of a pin 47 to the mounting member 42. Thus it will be obvious that the cylinder 44, through a hydraulic hose connection 48 and the like, can extend and retract the ram 46 to cause the pivoting of the member 42 about its pin 43.

A chainsaw attachment 49 is shown suitably affixed to the mounting member 42, and it will thus be understood that the chain saw 49 will pivot along with the pivoting of the member 42. Thus the chain saw 49 has the usual chain guide plate 51, and it has the usual saw chain 52 trained around the plate 51 such that the saw teeth 53 are available for the usual cutting action. Thus, as shown in FIG. 2, a log 54 supported on the fork 16 will be within the pivotal path of the chain saw 49 when the latter is pivoted downwardly from its shown position in FIG. 1. This will cause the saw 49 to cut the log 54, but it will do so without pinching the saw since the overhanging ends of the log 54, relative to the tines 32, will cause the cut in the log ot remain open while the saw is cutting completely through the log.

A motor, such as a pneumatically operated motor 56 is shown as a connected part of the saw 49, and a pneumatic line 57 extends to the motor 56 to power the motor 56 and operate the saw by moving the saw chain 52 around the chain guide 51, in the usual manner of chain saw operation. Of course the hydraulic cylinders described, and the motor 56, being of any desirable type including pneumatic, hydraulic, and electric types, would all be powered from the tractor.

A spring-loaded saw guard 58 is included in the saw 49, such as in the usual manner, and the guard 58 has a pivot pin 59 which permits the guard 58 to protect the operator from the saw chain 52, while at the same time the spring-loaded guard 58 would permit the saw chain 52 to move through the log, again in the usual and conventional manner of providing a spring-loaded chain saw guard 58.

The saw 49 is therefore required to move from a position above the log 54 and downwardly thereon to avoid pinching of the saw. Also, the chain saw 49 is required to move through only a small angle, of say less than ninety degrees, for the sawing action described to have it saw through any and all logs on the fork tines 32. Further, FIG. 3 shows that the saw chain 52 can be centrally mounted with respect to the tines 32 and the tines surfaces 61 extend forwardly beyond the forward surface 62 of the upright post 39. Thus the saw chain 52 will not contact the post 62, nor will it contact any other part of the structure while completely sawing through and somewhat beyond the log 54. Further, the cylinder 44 provides a stop or limit for pivoting the member 42, and such stop can simply be the point of full extension of the ram 46 from the cylinder 44 indicated by the dotted position of the piston 63 in FIG. 3. Further, another means of providing a stop is to have the mounting member top plate 64 align with the mounting post member at 62, and thereby restrict further downward pivot of the saw 49, as desired.

FIG. 3 also shows that the fork 16 commonly has a grapple 66 which is fragmentarily shown in FIG. 3 and which is on the mounting member 42 to pivot therewith and thereby serve as a grapple or securing finger which would overlie the logs on the fork tines 32, in a well-known and conventional manner. Thus the saw 49 and the grapple 46 could both include the respective plates or mounting members 42 as parts thereof, and these two attachments, namely the saw 49 and the grapple 66, could therefore be interchanged on the fork 16. Thus the feature of interchanging the saw 49 with the commonly provided grapple 66 is an advantage in this structure, and no special and separate mounting for a chain saw 49 is required, but the fork structure can be readily converted between the one with the grapple attachment or the one with the chain saw attachment.

Thus the chain saw 49 is pivotally mounted at a point adjacent and shown to be slightly above the upper ends of the fork tines 32, so that the saw mounting is above the horizontal plane of the upper ends of the tines 32. In this manner, the saw has the advantage described, and it is interchangeable with the grapple.

What is claimed is:

1. In a logging fork with a chain saw attachment, a tractor, a logging fork pivotally mounted on said tractor to be raised and lowered thereon and having spaced-apart tines extending forwardly of said tractor at the lower end of said fork for upwardly supporting a log extending across said tines, powered means connected between said tractor and said fork for pivoting the latter, a chain saw pivotally mounted at one end thereof and operatively connected with and pivotal along a plane intermediate said tines, means for operating and pivoting said chain saw relative to said log for sawing said log, the improvement comprising said fork including a mounting member disposed on said plane intermediate said tines and positioned on a horizontal plane at the upper end of said fork and between said fork and said tractor, said mounting member being pivotal about an axis extending in the direction parallel to the direction of the spacing between said tines, said means including a motor mounted on said mounting member, said chain saw affixed to and extending from said mounting member, said chain saw affixed to and extending from said motor above said horizontal plane which locates said mounting member, and said means including a powered pivot drive connected to said mounting member for pivoting said mounting member and said motor and said chain saw downwardly between said tines and below said horizontal plane for sawing said log from above said log and permit the opposite sawed ends of said log to fall down and away from said chain saw to free said chain saw from being pinched by said log during sawing.

2. The subject matter of claim 1, wherein said fork includes an upstanding post extending along said intermediate plane between said tines, and said mounting member being pivotally mounted on the upper end of said upstanding post.

3. The subject matter of claim 1, wherein said powered pivot drive includes a fluid cylinder and ram assembly pivotally connected at opposite ends to said fork and said mounting member.

4. The subject matter of claim 3, wherein said fluid cylinder and ram assembly is pivotally connected to said mounting member on the side of the pivot axis of said mounting member opposite from the direction said chain saw extends from said mounting member, and the length of said assembly in the fully extended position being dimensioned to present a limit position of downward pivot of said chain saw.

5. The subject matter of claim 1, including stop means operative on said mounting member for limiting the amount of downward pivot of said chain saw.

References Cited

UNITED STATES PATENTS 3,074,447   1/1963   Bombardier.
3,102,563   9/1963   Horncastle.
3,254,686   6/1966   Boyd et al.

DONALD R. SCHRAN, Primary Examiner.

U.S. Cl. X.R.

144—3, 143—43